US005617822A

United States Patent [19]
Masuda

[11] Patent Number: 5,617,822
[45] Date of Patent: Apr. 8, 1997

[54] LUBRICATING SYSTEM FOR ENGINE

[75] Inventor: Tatsuyuki Masuda, Iwata, Japan

[73] Assignee: Yamaha Hatsudoki kabushiki Kaisha, Iwata, Japan

[21] Appl. No.: 514,312

[22] Filed: Aug. 11, 1995

Related U.S. Application Data

[62] Division of Ser. No. 276,953, Jul. 19, 1994, Pat. No. 5,511,523.

[30] Foreign Application Priority Data

Jul. 26, 1993 [JP] Japan .................................. 5-184051

[51] Int. Cl.$^6$ ........................... F01M 1/06; F01M 11/02; F01B 31/10
[52] U.S. Cl. ................... 123/196 R; 123/193.6; 184/6.5; 92/158
[58] Field of Search ...................... 123/196 R, 196 W, 123/193.6; 184/6.5, 6.6; 92/158, 159, 160

[56] References Cited

U.S. PATENT DOCUMENTS

| | | | |
|---|---|---|---|
| 1,563,025 | 11/1925 | Hater | 92/160 |
| 1,851,086 | 3/1932 | Bruegger | 92/160 |
| 2,166,857 | 7/1939 | Bugatti | 92/160 |
| 2,197,942 | 4/1940 | Over | 92/160 |
| 3,521,531 | 7/1970 | Kaesemodel | 92/158 |
| 4,873,951 | 10/1989 | Garthwaite | 123/196 W |
| 4,969,430 | 11/1990 | Masuda . | |
| 5,138,991 | 8/1992 | Wojdyla | 184/6.5 |
| 5,163,341 | 11/1992 | Murrish et al. | 184/6.5 |
| 5,174,257 | 12/1992 | Ozawa . | |
| 5,251,584 | 10/1993 | Ohkubo . | |

FOREIGN PATENT DOCUMENTS

| | | | |
|---|---|---|---|
| 5519927 | 2/1980 | Japan | 123/196 M |
| 0648793 | 2/1979 | U.S.S.R. | 123/196 W |

*Primary Examiner*—Erick R. Solis
*Attorney, Agent, or Firm*—Knobbe, Martens, Olson & Bear

[57] ABSTRACT

An improved lubrication system for a two-stroke engine having a lubrication path from an oil sump directly to an induction valve assembly for noise reduction. The oil sump is divided into two chambers with a restricted passage therebetween to ensure lubrication of transmission gears upon startup while reducing drag during operation. A cross-drilled lubrication passage through each crankshaft throw terminates in a second passage proximate a dead-end plug, the second passage being in communication with the piston rod bearing. Each piston skirt includes at least one axial groove in registration with an oil supply passage. Circumferential grooves distribute the oil around the piston skirt from the axial grooves. The pistons may include ceramic top layers for heat insulation to increase the compression ratio possible by raising the ring positions. The engine incorporates an air/oil mixture separator within a balancer shaft chamber and air from the chamber is directed to the intake system.

20 Claims, 10 Drawing Sheets

LUBRICATING SYSTEM FOR ENGINE

This application is a divisional of U.S. patent application Ser. No. 08/276,953, filed Jul. 19, 1994, now U.S. Pat. No. 5,511,523.

BACKGROUND OF THE INVENTION

This invention relates to a lubricating system and more particularly to a lubricating system for use with internal combustion engines.

As is well known, most mechanisms that have moving parts require some form of lubricating system. These lubricating systems all have in common the necessity of ensuring adequate lubricant for the components being lubricating for long time intervals without servicing and preventing leakage of the lubricant to the atmosphere.

Internal combustion engines are typical examples of mechanisms that require lubrication. The problems in lubricating engines are typical of those of other applications but in some instances the lubricating system for an engine is more demanding because of the likelihood of the lubricant escaping to the atmosphere. This is particularly true with respect to two-cycle internal combustion engines wherein the lubricant is not contained within a separate lubricant sump and recirculated through the engine during its operation as with four-cycle engines.

With two-cycle engines it is expected that some of the lubricant will escape to the atmosphere through the exhaust system since the lubricant is not normally recirculated through the engine. As a result of this difference, it is desirable to accurately control the amount of lubricant that is supplied to an engine and particularly to two-cycle engines. With such arrangements, it is necessary to insure that the components of the engine receive adequate lubricant for all running conditions but also that excess lubricant is not supplied. The excess lubricant can escape to the atmosphere or carbonize within the engine, each of which causes its own type of problem Various lubricating systems have been proposed for two-cycle engines and some of these systems also have application to four-cycle engines. For example, the lubrication of the connecting rod journals on the crankshaft is a particularly critical area. Arrangements have been provided for ensuring that lubricant is delivered to the crankshaft journals under all running conditions, particularly during startup. One system which has been proposed for this use is described in U.S. Pat. No. 4,969,430, entitled LUBRICATION SYSTEM FOR TWO-STROKE ENGINE, issued Nov. 14, 1990 in the name of Tatsuyuki Masuda and assigned to the assignee hereof.

In that patent, an arrangement is illustrated wherein oil is delivered from the main bearings to the connecting rod bearings through a transversely extending passage formed in the throws of the crankshaft. This transversely extending passage is intercepted by a radially extending passage that extends to the connecting rod journal. Although that system is very effective in that it employs the centrifugal force of the crankshaft as a means for assisting in delivering the lubricant, it does have areas that could be improved. For example, the transverse drilling through the throw is closed at its outer end by a plug and the radial drilling intersects the transverse drilling at some distance from this plug. Hence, on initial startup it is necessary to fill the void area between the plug and the cross drilling before a lubricant will be forced from the cross drilling to the connecting rod journal.

It is, therefore, a first object of this invention to provide an improved arrangement for lubricating the connecting rod journals of a reciprocating machine.

It is a further object of this invention to provide an improved arrangement for lubricating the connecting rod journals of a reciprocating machine wherein it will be insured that lubricant will be delivered to the journals immediately upon the machine's operation.

In conjunction with the lubrication of reciprocating machines, an area of high wear and one requiring adequate lubrication is the skirt of the piston. Various arrangements have been provided for lubricating piston skirts and in some of these arrangements there are passages drilled through the cylinder liner and through which lubricant is delivered to the piston skirt. It is necessary and desirable to insure that the lubricant that is delivery to the piston skirt will cover substantially the entire skirt's circumference at least in the highly loaded areas transverse to the piston pin axis.

It is, therefore, a still further object of this invention to provide an improved arrangement for lubricating the skirt of a piston of a reciprocating machine.

It is a further object of the invention to provide a piston construction wherein lubricant can be easily distributed over the sliding surfaces of the skirt.

In conjunction with the primary application of the engine, frequently it is also the practice to drive an air pump off of the engine. This air pump may be employed either for the internal operation of the engine or, in certain automotive applications, may be employed for external or vehicular purposes. For example, with certain types of engines such as diesel engines, the induction system of the engine does not generate large amounts of intake manifold vacuum. Many vehicle accessories, such as power brake systems, however, require a source of vacuum so as to have atmospheric pressure assist.

Where the engine is provided with an air pump, it is desirable to supply lubricant to the air pump as with the engine itself. Like the engine, however, the lubricant that is supplied to the air pump should not be permitted to be discharged back to the atmosphere nor, for that matter, should the lubricant which may become entrained in the air pumped by the air pump be permitted to be delivered to the source where the air is delivered.

It is, therefore, a still further object of this invention to provide an improved lubricating system for an air pump for an internal combustion engine wherein the lubricant is drawn from and returned to a lubricant sump contained within the engine.

In accordance with another object of the invention, it is an object to provide an arrangement for separating the lubricant supplied to an air pump from the air pumped before the air is delivered to the desired location in the engine.

Another type of mechanism which requires lubrication is a transmission. Transmissions comprised of intermeshing gears should be well lubricated to insure good and long life operation with minimum of trouble. This applies not only to the transmission that transmits power from the engine to the powered source but also transmissions which may be contained within the engine such as the drives for camshafts, balance shafts and the like.

The simplest form of transmission lubrication system is a splash system wherein lubricant is contained within the transmission casing and is circulated therethrough merely by the rotation of the gears within the transmission. However, this type of transmission requires the immersion of a substantial portion of the lower-most gears in the transmission in the lubricant. This can give rise to heavy drag.

If, on the other hand, the transmission is maintained at a low fluid level, then once the mechanism begins to operate there may not be adequate lubricant in the sump so that the lower-most gears will contact it.

It is, therefore, a further object of this invention to provide a simplified transmission lubrication system wherein adequate amounts of lubricant are contained but wherein the gears are not deeply submerged in the lubricant when running.

It is a further object of this invention to provide an improved splash-type transmission lubrication system wherein the lower-most gear is relatively deeply submerged when the transmission is not operating so as to afford a large lubricant capacity but wherein the lubricant is pumped into another cavity during running of the transmission so as to reduce drag.

With the so-called splash type of transmission lubrication systems, there is also a problem in insuring adequate cooling of the lubricant. It is, therefore, a still further object of this invention to provide an improved arrangement for cooling the lubricant in a transmission.

SUMMARY OF THE INVENTION

A first feature of this invention is adapted to be embodied in an arrangement for lubricating the crankshaft connecting rod journal of a reciprocating machine having a crankshaft journalled for rotation about a crankshaft axis and having a throw with a bearing portion eccentric to the axis for receiving the big end of a connecting rod. A first lubricant passage extends transversely through the throw from an inlet end to an opening in the exterior surface of the throw. A closure closes the opening. A second lubricant passage extends from the bearing portion of the crankshaft to the first lubricant passage and intersects the first lubricant passage adjacent the closure for minimizing the dead volume of the first passage between the point of intersection and the closure.

Another feature of the invention is adapted to be embodied in a lubricating arrangement for a reciprocating machine that comprising a cylinder block defining a cylinder bore. A piston reciprocates in the cylinder bore. A lubricant passage extends through the cylinder block and intersects the cylinder bore at a point swept by a skirt of the piston. A lubricant distributing groove is formed in the piston skirt and is comprised of a first axially extending portion that extends along the skirt and which has at its ends circumferentially extending portions.

A further feature of the invention is adapted to be embodied in a lubrication and accessory drive system for an internal combustion engine that is comprised of an air pump for drawing air from a first location and delivering the pumped air to a second location. A lubricant pump draws lubricant from a lubricant reservoir and delivers the pumped lubricant to the air pump for its lubrication. In accordance with this feature of the invention, the air pumped by the air pump to the second location is passed through the lubricant reservoir for returning the lubricant used in lubricating the air pump back to the lubricant reservoir.

A further feature of the invention is adapted to be embodied in an air compressor lubricant separating system for an internal combustion engine that compresses an air compressor for drawing air from a first location and supplying the air to the engine. A lubricant system is provided for delivering lubricant to the air compressor for its lubrication. The engine has a compartment containing a shaft driven by the engine. A lubricant drain in the compartment communicates with a sump for the lubricant system for returning lubricant from the compartment to the lubricant sump. Means are provided for delivering air from the air compressor to the compartment and from the compartment to the engine for separating lubricant from the pumped air within the compartment and draining the lubricant back to the lubricant sump.

A further feature of the invention is adapted to be embodied in a lubricating system for a transmission comprised of an outer housing defining a transmission chamber. A gear is supported for rotation within the transmission chamber about a rotational axis and has a lower peripheral edge disposed above a lower wall of the transmission chamber and upper peripheral edge disposed above the rotational axis. Means define a first lubricant chamber in the transmission and into which at least the lower peripheral edge of the gear normally depends. Means provide a second lubricant chamber that communicates with the first lubricant chamber by gravity through a restricted passage. Means are provided for pumping lubricant from the first lubricant chamber to the second lubricant chamber when the gear is rotating for reducing the level in the first lubricant chamber to a point just slightly above the lower peripheral edge of the gear.

DETAILED DESCRIPTION OF THE PREFERRED EMBODIMENTS

Figure 1:
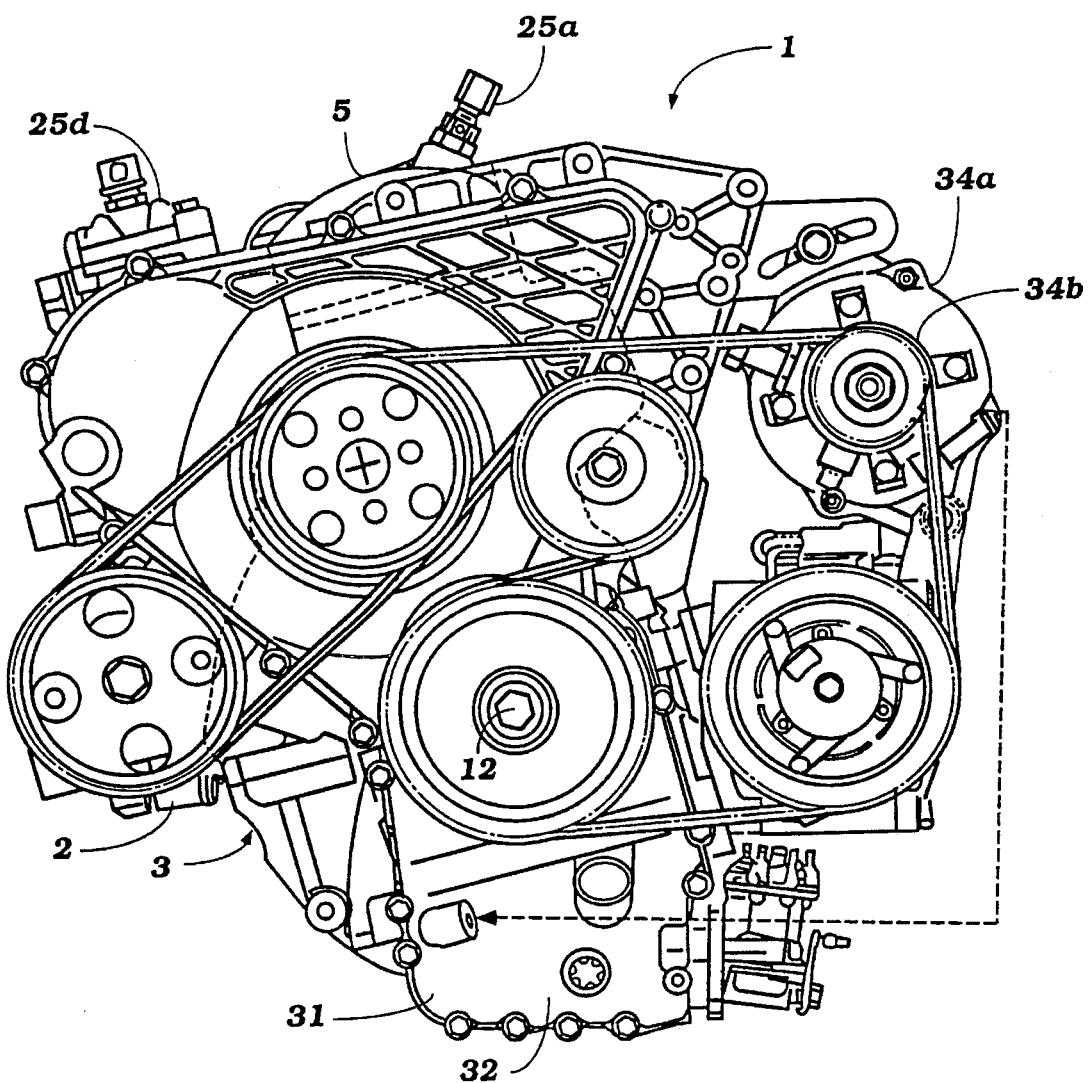
FIG. 1 is a front elevational view of an automotive diesel engine constructed in accordance with an embodiment of the invention.
Figure 2:
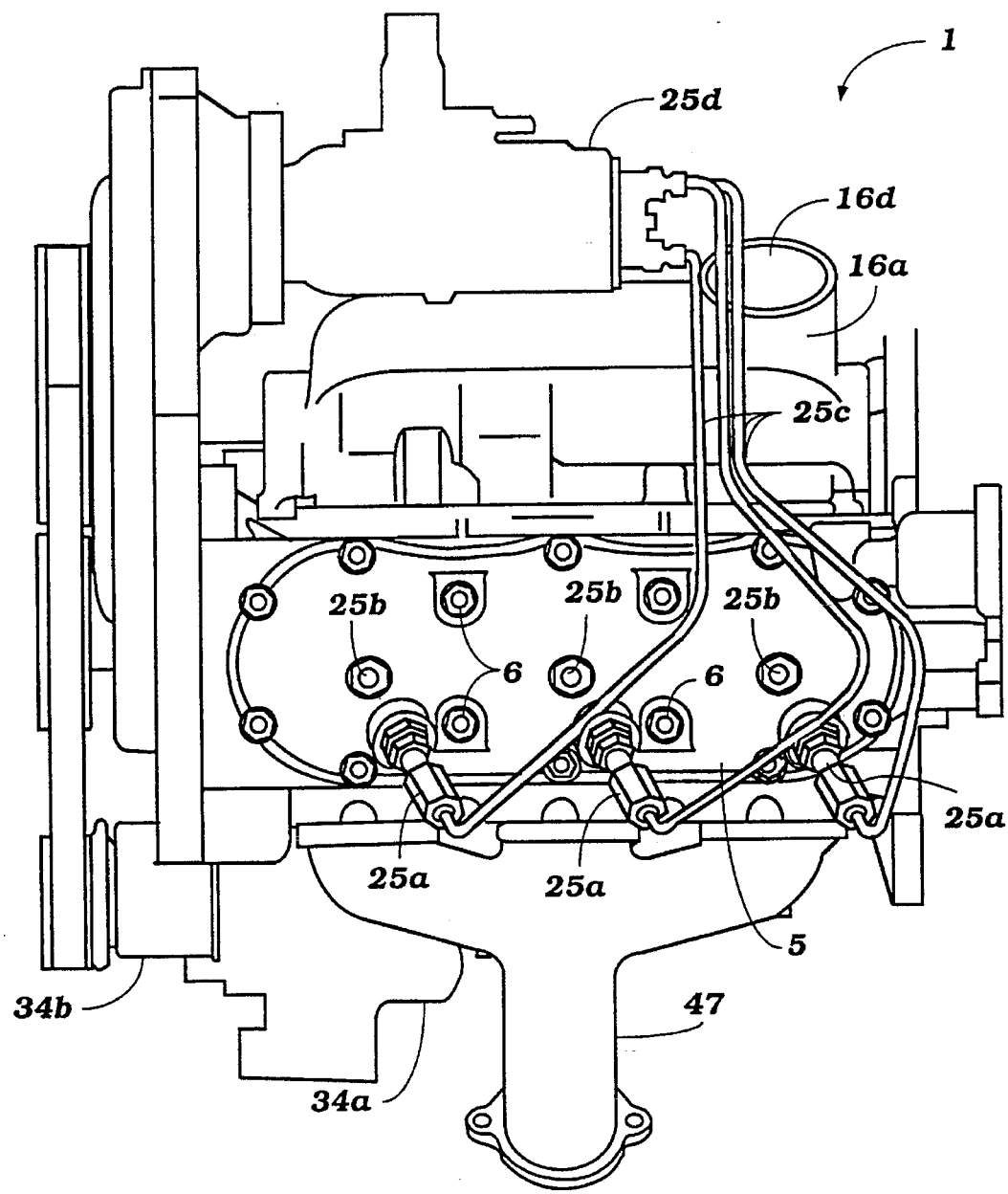
FIG. 2 is a top plan view of the engine.

Referring now in detail to the drawings and initially to the embodiment of FIGS. 1–4, an internal combustion engine constructed in accordance with an embodiment of the invention is identified generally by the reference numeral 1. The engine 1 is depicted as being of a three cylinder in-line type but will be readily apparent to those skilled in the art how the invention can be practiced with engines having other cylinder numbers and other cylinder configurations. In the illustrated embodiment, the engine 1 operates on a two-cycle crankcase compression diesel principle. Again, however, it will be readily apparent to those skilled in the art how the invention can be employed with engines operating on different cycles and with different combustion techniques (diesel or spark ignition). However, the invention has particular utility in conjunction with two-cycle engines having precombustion chambers such as diesel engines.

The engine 1 includes a cylinder block assembly 2 which, as has been noted, has an in-line configuration in the illustrated embodiment. The cylinder block 2 is disposed so that it is inclined from the vertical and in a forward direction as shown in FIG. 1. This orientation is particularly advantageous when employed in conjunction with a front engine motor vehicle having a transverse engine orientation wherein the cylinder block 2 will be inclined slightly forwardly.

Figure 3:
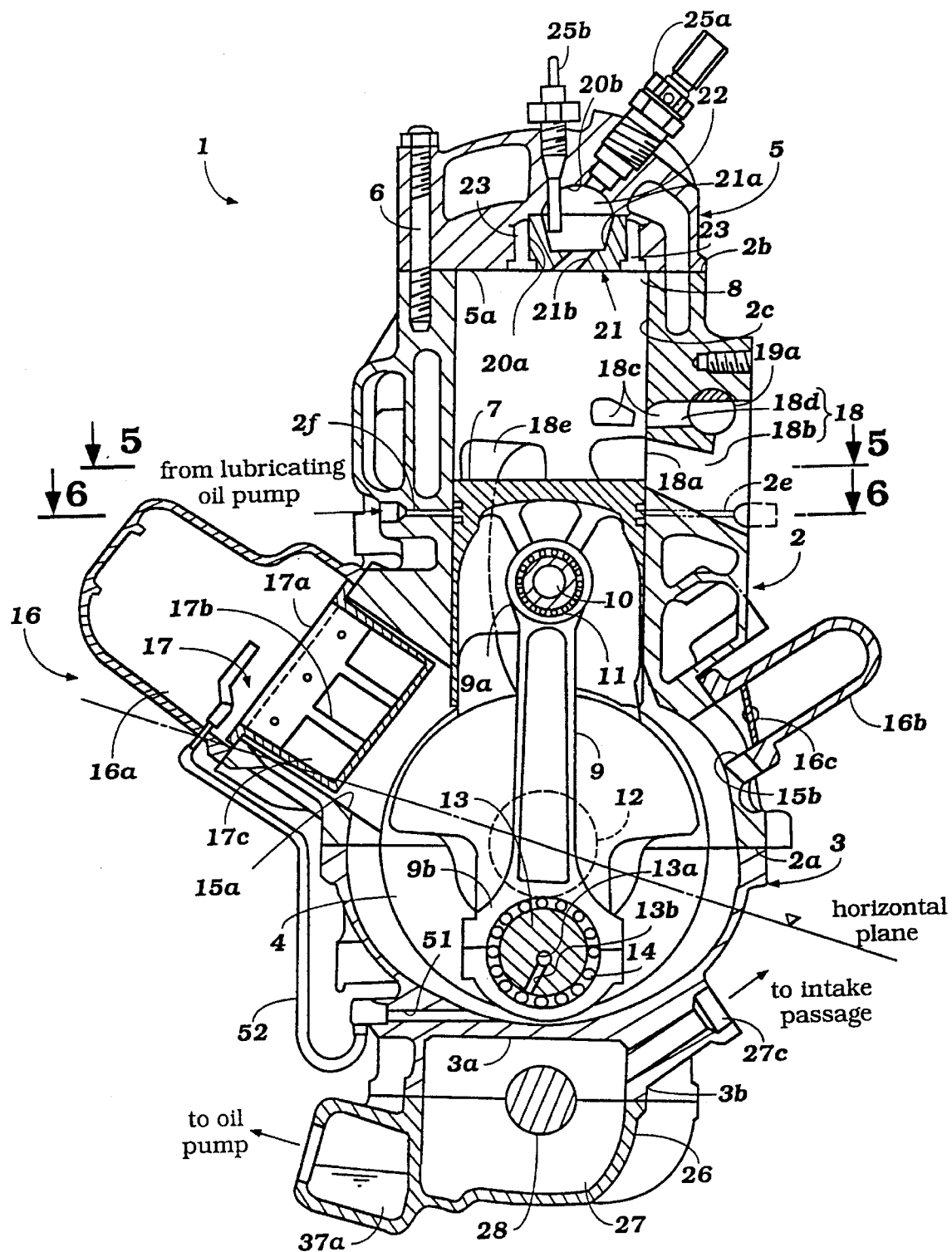
FIG. 3 is a cross-sectional view taken along a plane perpendicular to the crankshaft and generally along the line 3—3 of FIG. 4.

Referring now in detail primarily to FIG. 3, the cylinder block 2 is formed from a light alloy material such as aluminum and is provided with cylinder bores 2c which may be formed by liners (not shown). The cylinder bores 2c all have their axes aligned in a common plane which is, as has been noted, inclined to the vertical in the forward direction when viewing the engine compartment transversely. A cylinder head assembly 5 is affixed in a suitable manner to the cylinder block 2 at its upper end. A crankcase member, indicated generally by the reference number 3, is affixed to a skirt portion at the lower end of the cylinder block 2.

An intake air charge is delivered to a plurality of crankcase chambers 4 through an induction system, indicated generally by the reference numeral 16. This induction system includes an intake manifold 16a that draws an air charge through an air inlet device (not shown) and which delivers it to each of a plurality of intake passages 15a formed at the lower end of the cylinder block 2 and which communicate with the crankcase chambers 4. The cylinder block 2 has three sets of intake passages 15a formed through the lower portion thereof, each for communication with a crank chamber 4. The intake manifold 16a is thus common to all of the cylinders. Each crank chamber 4 communicates with the intake manifold 16a to a return hole 51 opening to the bottom of each crank chamber and leading to a hose 52. This return path ensures that the lubricating oil accumulated in the crank chamber 4 may be returned into the intake manifold 16a. Reed type valve assemblies 17 are provided in the intake passages 15a so as to permit the flow of the intake charge into the crankcase chambers 4 when the pistons 7 are moving upwardly in the cylinder bores 2c and for precluding reverse flow when the pistons are moving downwardly so as to compress the charge in the crankcase chambers. Each reed valve 17 comprises a valve cage 17a having openings 17b alternately opened and closed by valve plates 17c. The lubricating oil path through the hole 51 and hose 52 thus terminates at a location proximate the valve plates 17c to provide lubrication as a sound dampening medium.

The charge which is drawn into the crankcase chambers 4 and compress therein is then transferred to a main combustion chamber, indicated generally by the reference numeral 8 and formed by the cylinder bore 2c, piston 7, and by a cylinder head assembly 5 that is affixed to the cylinder block 2 with bolts 6, for example. The skirt portion of the cylinder block 2 which forms the upper portion of the crankcase chamber 4 is formed with three individual openings 15b, one for each crankcase chamber. A balance passage forming manifold 16b is affixed to the cylinder block 2 via threaded fasteners (not shown) through abutting flanges. The manifold 16b defines a longitudinally extending balance passage and a scavenging control valve 16c is disposed between each individual opening 15b and the common balance passage 16b. When the scavenging control valve 16c is opened, the crank chamber 4 connected with the particular opening 15b is in communication with the balance passage 16b, substantially enlarging the crank chamber volume and lowering the scavenging flow. In this manner, inner EGR gas increases and the combustion temperature drops. When the scavenging control valve 16c is closed, the crank chamber volume returns to normal.

Figure 5:
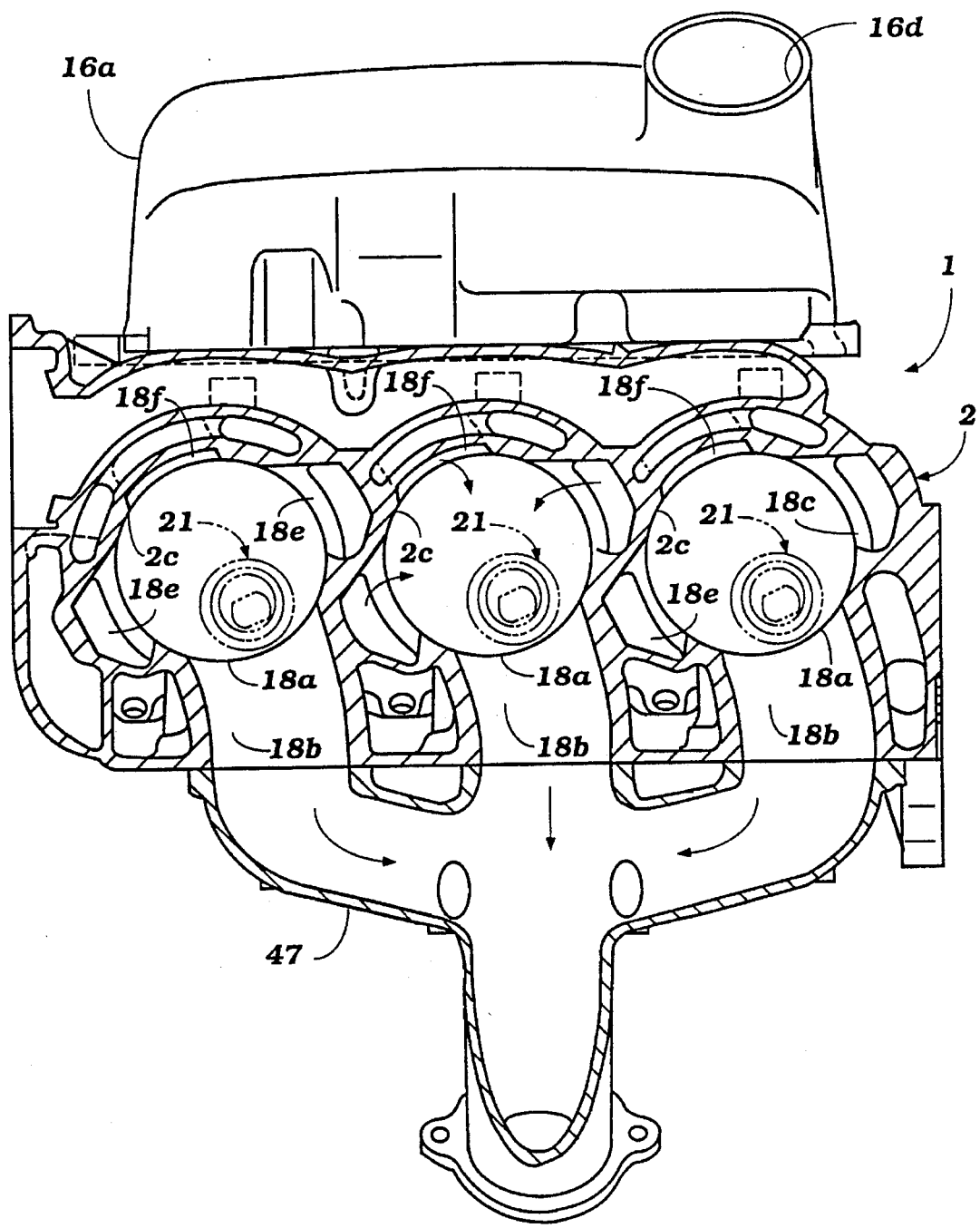
FIG. 5 is a cross-sectional view taken along the line 5—5 of FIG. 3.

As seen in FIGS. 3 and 5, a set of exhaust passages 18 for each cylinder are formed through the upper portion of the cylinder block 2. The exhaust passages 18 are comprised of a main exhaust passage 18b between the main exhaust port 18a and a cylinder outer connecting port. A subexhaust passage 18d leads to a pair of subexhaust ports 18c opened above the main exhaust port 18a. The exhaust passages 18b and 18d join at a mid-portion through the cylinder block 2. Each subexhaust passage 18d is opened or closed under control by an exhaust control system 19. The control system 19 is used for varying the exhaust timing and the compression ratio, and is inserted and disposed to cross the subexhaust passage 18d.

Figure 6:
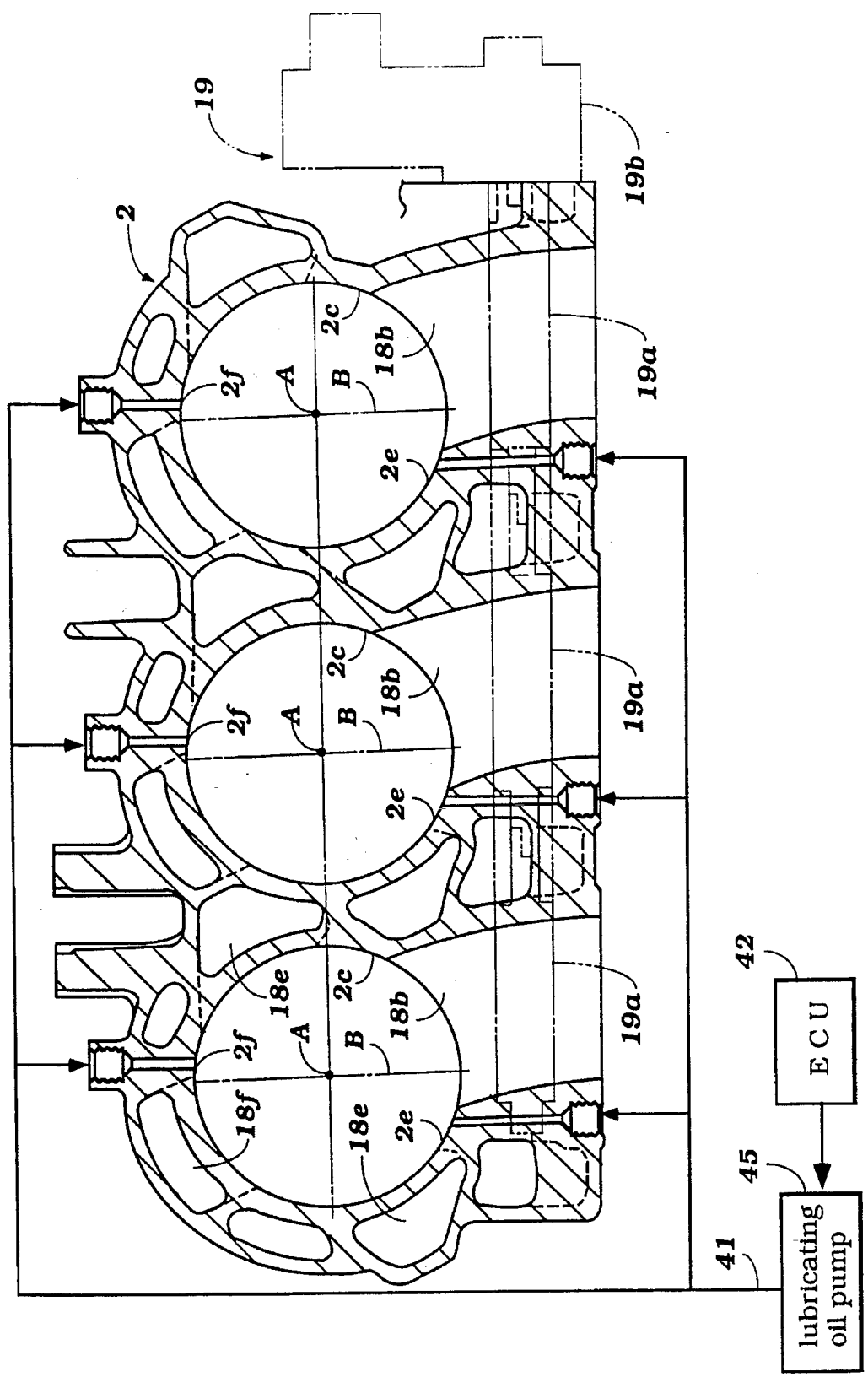
FIG. 6 is a cross-sectional view taken along the line 6—6 of FIG. 3.

The control system 19 is provided with three exhaust control valve bodies 19a across each sub-exhaust passage 18d and a driving mechanism 19b for opening and closing the valve bodies. Each exhaust control valve 19a comprises a round bar having an arcuate valve portion formed thereon. The control valves are connected with each other through engaging portions, as schematically indicated in FIG. 6. The driving mechanism 19b includes a driving shaft connected to an outer end of the exhaust control valve bodies 19a, and a driving motor is connected to the driving shaft through a gear train.

A pair of side main scavenging ports 18c are formed on both sides of the main exhaust port 18a. Further, an opposite center scavenging port 18f is formed opposite to the main exhaust port 18a. The three scavenging ports 18e and 18f communicate with each crank chamber 4 for the particular cylinder. The various exhaust ports and exhaust passages may be more clearly seen in FIG. 5. As the piston 7 is driven downwardly, eventually the various exhaust ports formed in the cylinder block and communicating with the exhaust passages will open and the exhaust gases can be discharged to the atmosphere to an exhaust manifold 47.

Figure 4:
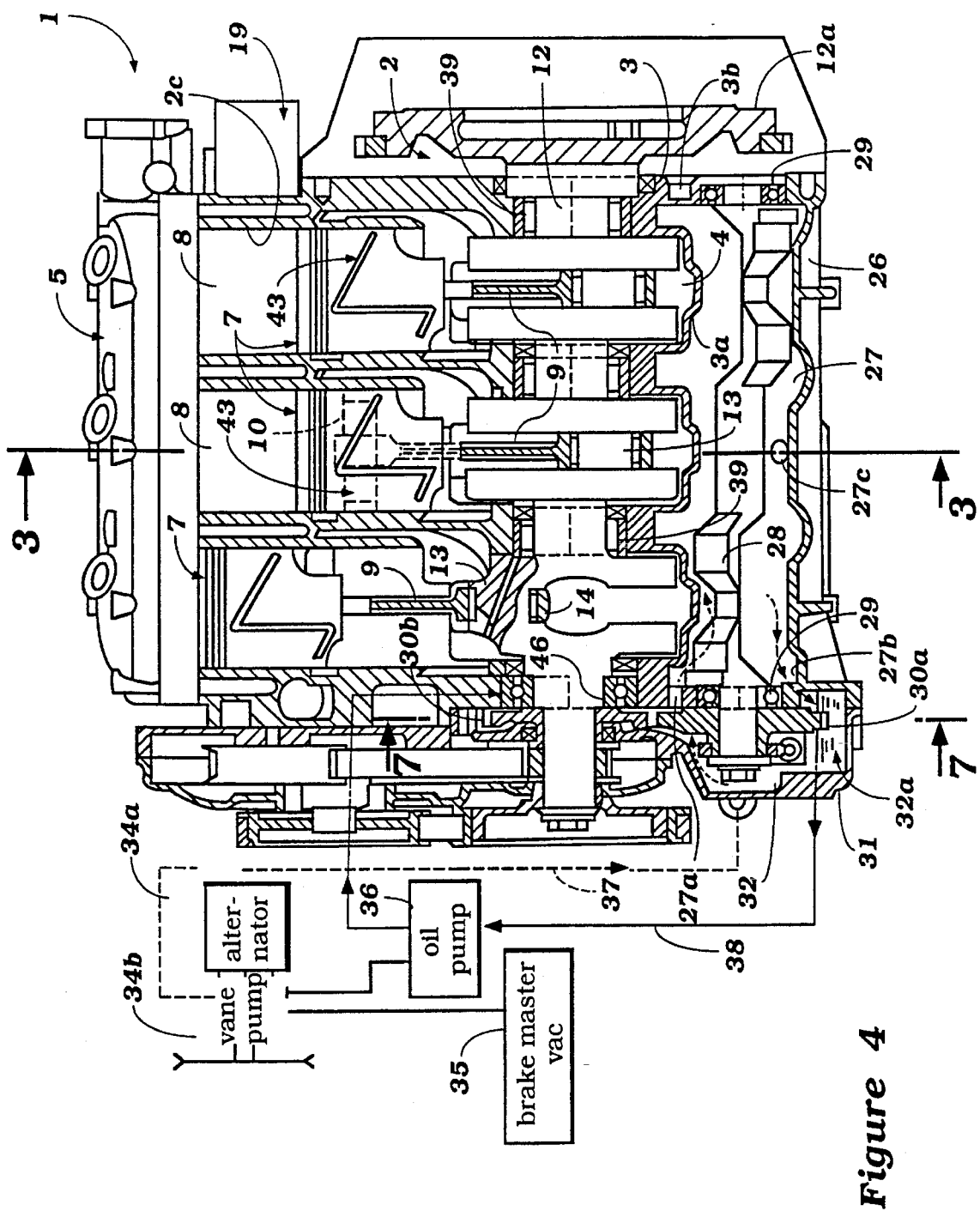
FIG. 4 is a side elevational view, on a scale reduced from that of FIG. 3, with a portion of the engine broken away and shown in section.
Figure 7:
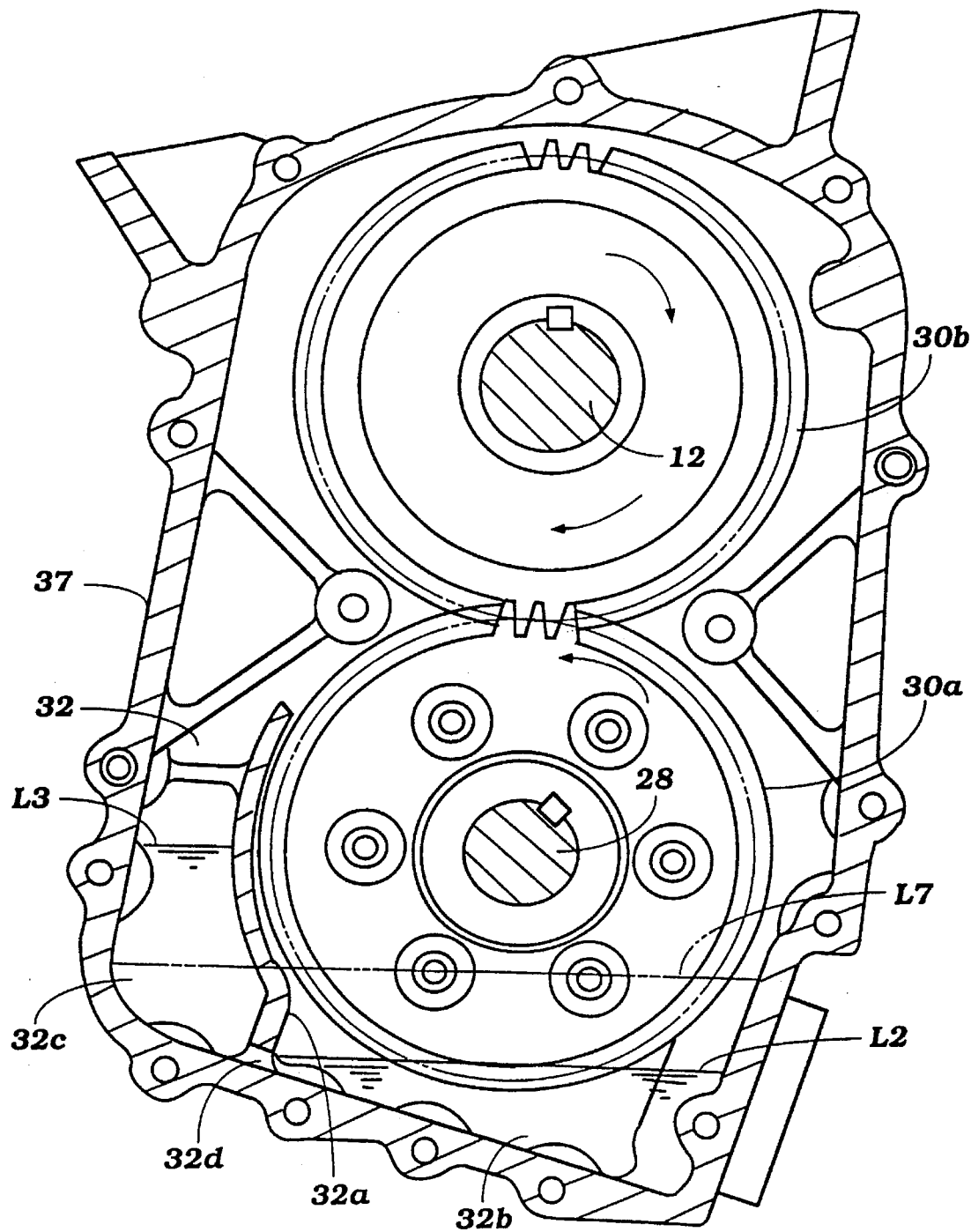
FIG. 7 is an enlarged cross-sectional view taken along the line 7—7 of FIG. 4.

Now with reference to FIGS. 3 and 4, a balancer shaft, indicated generally by the reference number 28, is rotatably journalled within a balancer shaft chamber 27 formed beneath the crankcase chambers 4 and defined by the crankcase member 3b and a cover member 26 which is affixed thereto. The balancer shaft 28 is rotatably journalled in a pair of spaced apart bearings 29 and rotates about an axis that is parallel to the axis of the crankshaft 12, and at the same speed but in the opposite direction, as best seen in FIG. 7. Due to the fact that the engine 1 is a two-cycle, crankcase compression type, it is possible to put the balancer shaft 28 substantially beneath the crankshaft 12 without adding significantly to the height of the engine. This is because the engine 1 does not require a crankcase which holds a volume of lubricant, as is true with conventional 4-stroke engines.

With specific reference to FIGS. 4 and 7, the balancer shaft 28 is driven from the crankshaft 12 so as to rotate at crankshaft speed but in an opposite direction. The transmission includes a driving gear 30b that is affixed to the end of the crankshaft 12 opposite to the flywheel 12a and which is in meshing engagement with a driven gear 30a keyed to the balancer shaft 28. The balancer shaft 28 has formed integrally therewith three eccentric masses, one for each cylinder 2c of the associated engine. As is well known, the rotation of the eccentric masses will cause the balancing of certain forces on the engine.

Improved Transmission Sump

The gears 30a and 30b are located in a gear chamber 32 formed by the end surfaces of the cylinder block 2, crankcase 3 and balancer cover 26, along with a gear cover 31. The gear chamber 32 communicates with the balancer chamber 27 through upper and lower communication holes 27a and 27b, respectively, as seen in FIG. 4. FIG. 7 illustrates the gear chamber 32 having first and second oil reservoirs 32b and 32c, respectively, with the first oil reservoir being larger than the second. A curvilinear wall or partition 32a is formed adjacent the driven gear 30a and across the gear chamber 32 along the balancer shaft 28 axis. The first and second oil reservoirs 32b, 32c communicate with each other by gravity through a restricted communication passage 32d formed through the lower edge of the partitioned wall 32a.

With the engine stopped, the lubricating oil level is L1 in both first and second oil reservoirs 32b, 32c. During engine 1 operation, the oil levels in the first and second oil reservoirs 32b, 32c become L2 and L3, respectively. This is due to lubricating oil being thrown to the outside regions of the gear chamber 32 during the spinning operation of the gears 30a and 30b. The lubrication in the second oil reservoir 32c will gradually seep back into the first oil reservoir 32b due to the restriction passage 32d. The end result is that the gear 30a is substantially immersed in lubrication at the time of startup of the engine 1 (corresponding to lubrication level L1), while in operation, the oil level within the first oil reservoir 32b reduces to L2 which reduces the contact between the driven gear 30a and the lubricant. Thus, there is less frictional temperature rise of the lubricating oil and less drag resistance to rotation of the gear 30a. Further, because of the reduced level L2 of lubricant within the first oil reservoir 32b during operation the problem of the lubricant "frothing" from frictional contact with the driven gear 30a is reduced.

Another benefit of this improved sump arrangement is that a majority of the lubricating oil is present in the second oil reservoir 32c during operation of the engine 1. The lubricant is thus in intimate contact with an exterior surface of the gear cover 31 and crankcase 3, which increases heat dissipation therethrough and more effectively cools the temperature of the lubricant.

Separating System for Air Compressor Lubricant

Because the engine 1 in a preferred embodiment is a two-cycle, diesel engine, the negative intake pressure for the brake booster vacuum motor 35 is often insufficient. Still with reference to FIGS. 4 and 7, the engine 1 is provided with a negative pressure producing vane pump or air compressor 34b coaxial with an alternator 34a which is driven by the crankshaft 2. Lubricating oil is supplied to the air compressor 34b via an oil pump 36. The supply of lubricating oil is drawn through an oil passage 38 from the gear chamber 32. Subsequently, the output air and lubricant mixture from the air compressor 34b is then channeled back to an upper region of the gear chamber 32 through a mixture passage 37. A majority of the oil discharged with the air from the air compressor 34b then condenses and joins with the oil in the first and second oil reservoirs 32b and 32c. The vaporous mixture still having lubricant remaining therein flows into the balancer chamber 27 through the upper communication passage 27a. Most of the remaining lubricating oil then condenses and is separated and returns to the oil reservoirs 32b, 32c via the lower communication passage 27b. The air, substantially separated of lubricating oil, is then supplied from an air discharge port 27c (FIG. 3) into the intake manifold 16a through a breather hose (not shown). The balancer 27 thus functions as a breather chamber for separating the oil and air mixture output from the air compressor 34b.

Connecting Rod Bearing Lubrication

As mentioned, the cylinder block 2 has three cylinder bores 2c formed in parallel, and each cylinder bore has a piston 7 which can reciprocate therein. The piston is connected to a small end 9a of a connecting rod 9 through a piston pin 10 and needle bearing 11, while the large end 9b of the connecting rod is connected to the crank pin or throw 13 of the crankshaft 12 through a needle bearing 14. As seen in FIG. 4, the crankshaft 12 is journalled by bearings 46 and 39 within the crankcase 3.

The present invention provides an improved arrangement for lubricating the connecting rod journals 14 immediately upon startup of the engine 1. More particularly, the engine 1 is provided with a separate lubricating system that includes a source of lubricant and lubricating pump 45 that delivers lubricant to various components of the engine. This includes an arrangement for lubricating the main bearing 39 and also the connecting rod bearing 14, which will be described below with reference to FIGS. 4 and 14. An ECU 42 controls the operation of the lubricating oil pump 45 by supplying a driving signal to the pump to provide the required amount of oil determined from engine parameters such as operating time, engine load, etc. The pump 45 may be driven under the control of the ECU 42 in any known manner.

Figure 14:
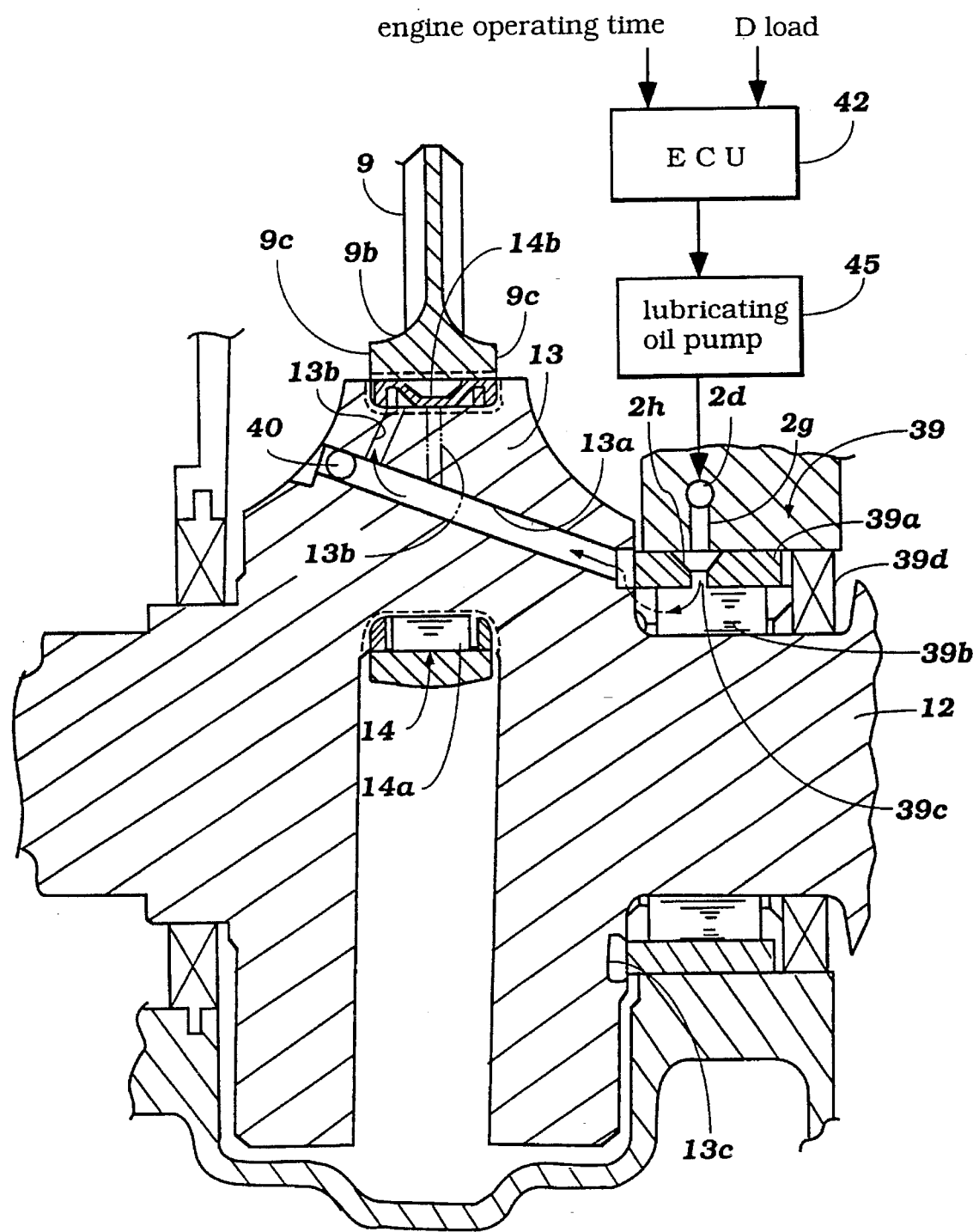
FIG. 14 is an enlarged cross-sectional view taken through one of the crankshaft bearings of the engine and showing the manner of lubrication.

With specific reference to the detailed view of FIG. 14, each bearing 39 journalling the crankshaft 12 between adjacent cylinders 2c comprises a roller bearing assembly 39b within an outer race 39a. Fully independent crank chambers 4 are provided for each of the cylinders 2c within the lower portion of the cylinder block 2 and crankcase 3. As is well known in this art, the crankcase chambers 4 associated with each of the cylinder bores 2c are sealed from each other so as to facilitate the two-cycle crankcase compression operation of the engine 1. In the illustrated embodiment, a sealing member 39d prevents communication between adjacent crank chambers 4. A main oil gallery 2d is formed in the crankcase 3 and receives lubricant under pressure. A plurality of delivery passages 2g intersect the gallery 2d and deliver oil to an oil delivery opening 2h in the bearing outer race 39a. This lubricant then flows and lubricates the rollers of the bearing 39. Lubricant which escapes from the bearing 39 will be directed by the seal 39d inwardly and will flow into an oil retaining groove 13c in the crank pin 13.

A cross-drilled passageway 13a extends through the throw 13 and is closed at its opposite end by a plug 40. Oil will be drawn from the retaining groove 13c and transferred by centrifugal force into the cross-drilled passageway 13a. A delivery passage 13b intersects the first passageway 13a and the bearing 14 so as to lubricate this bearing. Hence, excess lubricant will be delivered to the bearing 14. The second passage 13b is branched at a location close to the plug 40, and extends obliquely with respect to the axis of the connecting rod 9 thus minimizing the amount of lubricant which must be accumulated in the passage 13a before the centrifugal force causes flow into the passage 13b, unlike the prior art type of construction. This arrangement ensures that lubricating oil supplied from the pump 45 to the bearing 39 is forced to flow to the journal 14 directly after startup of the engine 1 due to the minimal dead volume of the first passageway 13a between the opening of the second passageway 13b and the plug 40. The plug 40 may comprise a ball. FIG. 14 also shows a conventional branch passage 13b' in dashed lines which extends proximate the longitudinal center of the throw 13, i.e., from a position distant from the plug 40 and extends generally parallel with the axis of the connecting rod 9 and thus the passage 13a has a dead space which must be filled with lubricant before lubricant will flow into passage 13b'.

Piston Skirt Lubrication

With reference now to FIGS. 3, and 6, the cylinder block 2 has a pair of transverse oil passages 2e and 2f formed therethrough for each cylinder to supplying lubricating oil to the sliding surfaces of the piston 7. These oil passages 2e, 2f penetrate the cylinder block 2 perpendicularly to the crankshaft 12 and are rotationally displaced around the cylinder axis A. The oil passages 2e and 2f terminate at the cylinder bore 2c between the piston rings of the piston 7 when the position of the piston is at bottom dead center, shown in FIG. 3, and register with the skirt of the pistons 7 during substantially its full stroke. These oil passages 2e and 2f are connected to the lubricating oil pump 45 through oil supplying passages 41.

Figure 10:
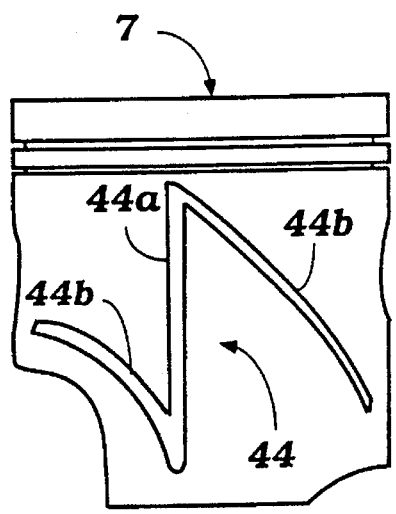
FIG. 10 is a side elevational view of a piston constructed in accordance with the invention.
Figure 12:
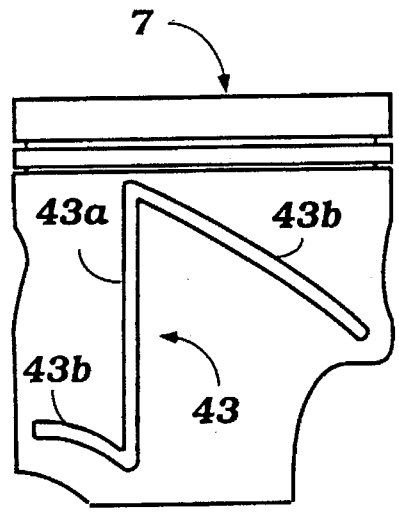
FIG. 12 is a side elevational view, of the piston looking at the side opposite that shown in FIG. 10.

Now with reference to FIGS. 10 and 12, each piston 7 has a pair of oil distributing grooves 43, 44 formed in the skirt portion to uniformly spread oil supplied from the oil passages 2e and 2f over the piston skirt sliding surfaces. These distributing grooves 43, 44 comprise axially disposed grooves 43a and 44a offset circumferentially around each piston 7 so as to remain in register with the oil passages 2e and 2f in the cylinder bore 2c. Obliquely disposed generally circumferential grooves 43b and 44b extend from the upper and lower ends of the axial grooves 43a and 44a. These circumferential grooves 43b, 44b extend generally perpendicularly to the axis of the piston 7 and ensure that lubricant is delivered substantially around the entire circumference of the piston skirt. In a preferred form, the oblique grooves 43b, 44b extend from opposite ends of the axially disposed grooves 43a, 44a in directions around the circumference of the piston 7 which are inclined relative to the axis A of the cylinder bores 2c. Furthermore, the oblique grooves 43b, 44b preferably extend from each axial groove 43a, 44a in opposed directions around the piston circumference but are inclined relative to the piston axis A toward each other. Because of this orientation, the reciprocation of the piston 7 will cause lubricant to be distributed along the full circumferential extent of the grooves 43a and 43b.

The provision of the axial grooves 43a and 44a, and oblique grooves 43b and 44b, ensures the skirt sliding surfaces of each piston 7 can be lubricated around their circumferences with a smaller number of oiled holes in each cylinder bore 2c wall. Further, because oil remains in the grooves 43, 44 even when the engine is out of operation for long periods, lubrication can be resumed instantly after restarting the engine.

Improved Pre-combustion Chamber Insert

Figure 8:
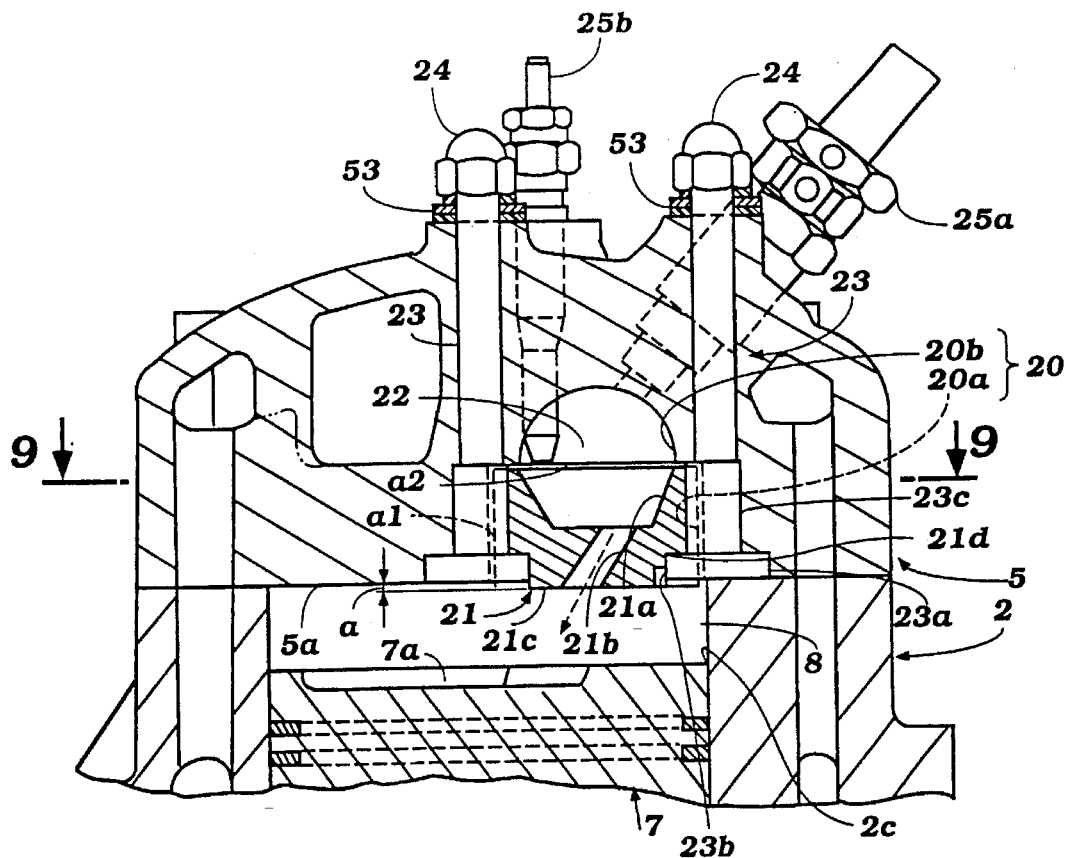
FIG. 8 is a further enlarged cross-sectional view taken along a plane parallel to the plane of FIG. 3 and shows in more detail the way in which the precombustion chamber is formed.
Figure 9:
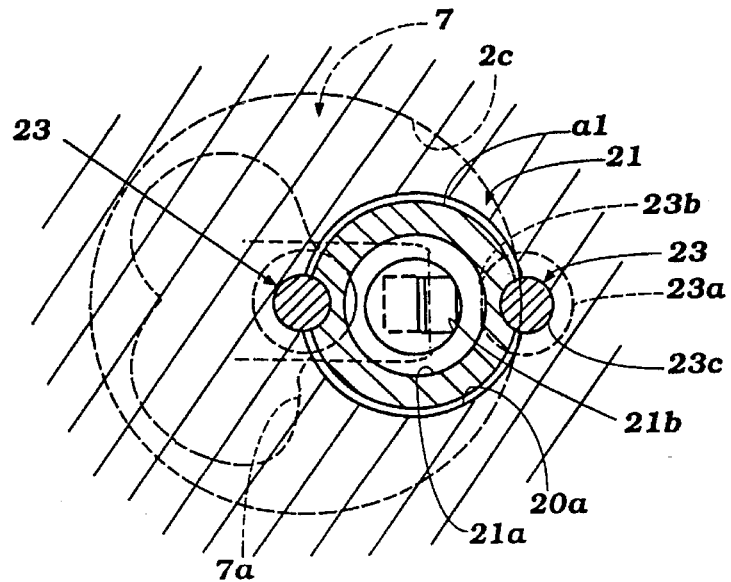
FIG. 9 is a cross-sectional view taken along the line 9—9 of FIG. 8.

The reader's attention is now directed to FIGS. 3, 8 and 9 for discussion of an improved precombustion chamber insert.

The cylinder head assembly 5 is comprised of a main cylinder head casting member which may be formed from a lightweight, highly heat conductive material such as aluminum or an aluminum alloy. The cylinder head 5 has a lower surface 5a that is in sealing relationship with the cylinder block 2 around the cylinder bores 2c. A cylinder head gasket (not shown) may be interposed between the cylinder head surface 5a and cylinder block 2 for sealing purposes, as is well known in this art. Threaded fasteners 6 affix the cylinder head members 5 to the cylinder block 2, as mentioned above. The cylinder head surface 5a forms with the cylinder bore 2c and heads of the pistons 7, the main combustion chambers 8 previously referred to.

A precombustion chamber 22 is formed in the cylinder head assembly 5 in a manner now to be described. This precombustion chamber 22 is offset to one side of the cylinder bore 2c from the center of the cylinder bore. In a preferred arrangement, this offset is toward the side of the cylinder bore away from the opposite scavenging ports 18f. This precombustion chamber 22 is formed by a spherical segment 20b integral with the cylinder head member 5 and at the base of a counterbore 20a.

An insert piece, indicated generally by the reference numeral 21, is positioned within this counterbore 20a and affixed therein in a manner to be described. The insert piece 21 is formed preferably from a heat resistant steel, for example a steel designated as SUH 3 according to the Japanese Industrial Standards (JIS). This material has a lower heat conductivity and a lower thermal expansion than the aluminum of the main cylinder head member 5.

The insert piece 21 is formed with a recessed area 21a which has a surface of a segment of a cone with the upper diameter thereof being equal to the spherical diameter of the spherical portion 20b of the main cylinder head member 5. The lower diameter may have any desired shape and thus the insert piece recess 21a and spherical cylinder head section 20b form the precombustion chamber volume 22 previously described.

A transversely extending throat 21b is formed in the lower end of the insert piece 21 and communicates the prechamber volume 22 with the main combustion chamber 8. This throat 21b is directed so that it will terminate substantially at the center of the cylinder bore 2c and direct the charge issuing therefrom downwardly into the cylinder bore toward the opposite scavenge port 18f. The throat 21b is inclined so that hot gases may be directed directly into the inlet of a top surface cavity 7a formed in the piston 7. The bottom surface 21c of the insert piece 21 projects downward from the cylinder head mating surface 5a by a small distance a for a purpose to be described.

A fuel injector 25a is mounted in the cylinder head member 5 and sprays into the prechamber recess 22 and through the throat 21b into the main chamber 8. To assist in the initiation of starting and combustion, a glow plug 25b may be positioned with its tip in the prechamber recess 22.

As the piston 7 approaches the top dead center position, and as the pressure rises in both the prechamber 22 and main chamber 8, fuel injected by the injector 25a, due to the high temperature in the prechamber, will ignite, burn, and expand. This expansion occurs also through the throat 21b so as to fire the charge in the main chamber 22 and complete the combustion and the driving of the piston 7 downwardly. While fuel is injected close to the top dead center point in a compression stroke, the flame blows out of the throat 21b. Because the bottom surface 21c of the insert piece 21 is projected downward into the main combustion chamber 8, the gap between the top surface of the piston 7 and the mating surface 5a of the cylinder head 5 becomes narrower by the distance a. Consequently, this projected portion functions as a masking and air is regulated so as to flow into the top surface cavity 7a of the piston 7. Preferably, the projection distance a is set between 0.1 and 1.0 mm.

The insert piece 21 is fixed in the counterbore 20a via fixing bolts 23 inserted into the cylinder head 5 of an outward direction from the main combustion chamber side 8. The bolts 23 are secured with cap nuts 24 and sealing gaskets 53 therebetween. Inner flange portions 23a of the bolts 23 support stepped portions 21d of the insert piece 21, while cutout portions 23b in the flange portions prevent rotation of the bolts. Furthermore, the larger diameter portions 23c of the fixing bolts 23 provide contact between the counterbore 20a and the outer wall of the insert piece 21, as best seen in FIG. 9. Annular heat insulation gap a1 and circular heat insulation gap a2 nearly eliminate conductive heat transfer between the insert piece 21 and the surrounding counterbore 20a and cylinder head 5. The heat insulation gaps a1 and a are preferably approximately 0.5 and 1.0 mm, respectively. The provision of the heat insulation gaps a1 and a2 allow higher temperatures within the precombustion chamber 22 for more efficient ignition and combustion. The downwardly projecting insert piece 21 into the cylinder cavity 8 further increases the efficiency of combustion by directing air from the precombustion chamber into the top cavity 7a of the piston 7. Furthermore, because the insert piece 21 is affixed within the combustion chamber 8 via the fixing bolts 23, the location of the insert piece is not specifically limited.

Piston Ceramic Insulation Layer

Figure 11:
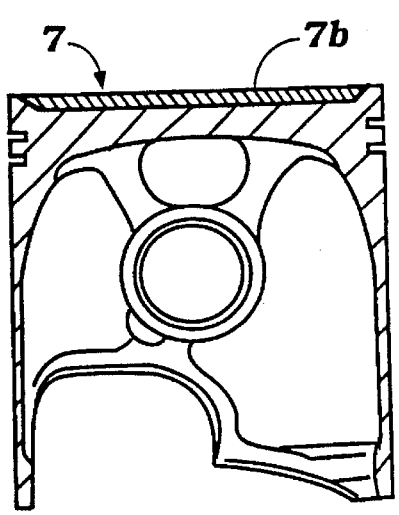
FIG. 11 is a cross-sectional view of the piston shown in FIG. 10 and taken along a plane perpendicular to the plane of FIG. 10.
Figure 13:
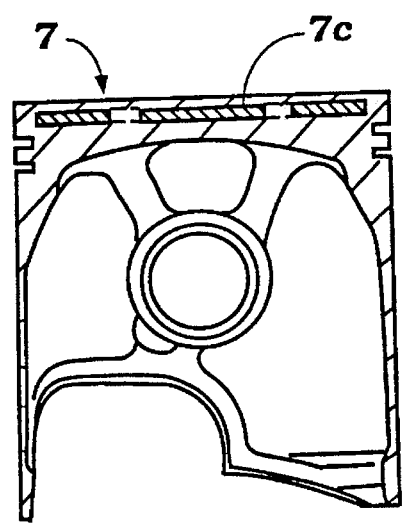
FIG. 13 is a cross-sectional view of the piston shown in FIG. 12, in part similar to FIG. 11, and taken along a plane perpendicular to the plane of FIG. 12.

In an alternative to the recess 7a formed in the top of the piston 7, as seen in FIG. 8, a ceramic layer 7b having a high heat insulation capability may be sprayed on the top surface of the piston, as seen in FIG. 11. Likewise, a layer of ceramic 7c can be cast directly into the piston 7, as seen in FIG. 13. With these insulating layers, the temperature of the top of the piston 7 can be lower, allowing the piston rings to be placed nearer the top of the piston. Consequently, the compression ratio can be increased while avoiding ring sticking from excessive temperatures.

It should be readily apparent from the foregoing description that the described construction provides a very efficient and effective system for lubricating an engine or other reciprocating machine and insures immediate delivery of lubricant upon startup of the engine. In addition, the arrangement minimizes oil consumption and provides lubrication and oil separation for an engine accessory including an air pump for separating the lubricant from the air delivered by the air pump before it is introduced into the engine. Furthermore, an improved arrangement for lubricating a transmission is provided. Of course, the foregoing description is that of a preferred embodiments of the invention in various changes and modifications may be made without departing from the spirit and scope of the invention, as defined by the appended claims.

I claim:

1. An arrangement for lubricating the crankshaft connecting rod journal of a reciprocating machine having a crankshaft journalled for rotation about a crankshaft axis and having a throw with a bearing portion eccentric relative to said axis for receiving the big end of a connecting rod, a first straight lubrication passage extending transversely and completely through said throw between an opening in the external surface of said throw and an inlet, a closure for closing said opening, and a second straight lubricating passage extending from said bearing portion to said first lubricating passage and intersecting said first lubricating passage adjacent said closure for minimizing the dead volume of said first lubricating passage between the point of intersection and said closure.

2. A lubricating arrangement as set forth in claim 1 further including means for introducing lubricant at a low pressure to the inlet.

3. A lubricating arrangement as set forth in claim 2 wherein the inlet is disposed in a side of the throw opposite the opening and the source of lubricant is lubricant which has been delivered to a main bearing of the crankshaft on the side where the inlet is disposed.

4. A lubricating arrangement as set forth in claim 3 wherein the inlet is disposed in alignment with the main bearing.

5. A lubricating arrangement as set forth in claim 4 wherein the connecting rod is journalled on the bearing portion by means of roller bearings.

6. A lubricating arrangement as set forth in claim 1 wherein the reciprocating machine comprises a two-stroke crankcase compression internal combustion engine.

7. A lubricating arrangement as set forth in claim 6 wherein the connecting rod is journalled on the bearing portion by means of roller bearings.

8. A lubricating arrangement as set forth in claim 7 wherein the first lubricating passage is disposed at an acute angle to the crankshaft rotational axis with the opening being disposed radially outwardly of the inlet so that centrifugal force pressurizes the lubricant delivered to the second lubricating passage.

9. A lubricating arrangement as set forth in claim 8 wherein the inlet is disposed in a side of the throw opposite the opening and the source of lubricant is lubricant which has been delivered to a main bearing of the crankshaft on the side where the inlet is disposed.

10. A lubricating arrangement as set forth in claim 9 wherein the inlet is disposed in alignment with the main bearing.

11. A lubricating arrangement as set forth in claim 6 further including a piston connected to the other end of the connecting rod by a piston pin and slidably supported within a cylinder bore.

12. A lubricating arrangement as set forth in claim 11 wherein the piston is provided with an axially extending groove terminating at its opposite ends and circumferentially extending grooves for distributing lubricant to the skirt of said piston.

13. A lubricating arrangement as set forth in claim 12 wherein there are grooves provided on opposite sides of the piston skirt in an area disposed substantially perpendicularly to the axis of the piston pin.

14. A lubricating arrangement as set forth in claim 12 further including an oil delivery hole extending through the cylinder block and intersecting its cylinder bore in a position swept by a skirt of the piston and in registry with the axially extending groove.

15. A lubricating arrangement as set forth in claim 14 wherein there is a groove arrangement and oil delivery passage on the sides of the piston disposed between the piston pin.

16. A lubricating arrangement for a reciprocating machine comprising a cylinder block defining a cylinder bore, a piston reciprocating in said cylinder bore, a lubricating passage extending through said cylinder block and intersecting said cylinder bore at a position swept by a skirt of said piston, and a lubricant distributing groove formed in said piston skirt comprising a first portion extending axially along said skirt and having at its ends circumferentially extending portions.

17. A lubricating arrangement as set forth in claim 16 wherein the circumferentially extending portions are inclined relative to the axis of the cylinder bore.

18. A lubricating arrangement as set forth in claim 17 wherein the inclined circumferentially extending portions extend from the respective ends of the first portion axially toward each other.

19. A lubricating arrangement as set forth in claim 18 wherein there are lubricant delivery grooves formed on diametrically opposite sides of the piston and each supplied with lubricant from a respective lubricating passage extending through the cylinder block and generally aligned with the first portions of the groove.

20. A lubricating arrangement as set forth in claim 16 wherein there are lubricant delivery grooves formed on diametrically opposite sides of the piston and each supplied with lubricant from a respective lubricating passage extending through the cylinder block and generally aligned with the first portions of the groove.

* * * * *